United States Patent [19]

Kawasaki et al.

[11] Patent Number: 5,571,430
[45] Date of Patent: Nov. 5, 1996

[54] METHOD AND SYSTEM FOR PROCESSING WORKPIECE WITH LASER SEAM, WITH OSCILLATION OF BEAM SPOT ON THE WORKPEIECE AND BEAM OSCILLATING APPARATUS

[75] Inventors: Minoru Kawasaki; Akio Sato; Hitoshi Kinoshita; Koji Yamada, all of Toyota, Japan

[73] Assignee: Toyota Jidosha Kabushiki Kaisha, Toyota, Japan

[21] Appl. No.: 360,453

[22] Filed: Dec. 21, 1994

[30] Foreign Application Priority Data

Dec. 28, 1993 [JP] Japan ................................. 5-336315

[51] Int. Cl.$^6$ ................................................. B23K 26/06
[52] U.S. Cl. ........................... 219/121.78; 219/121.74; 359/220
[58] Field of Search ................ 219/121.74, 121.78, 219/121.8; 359/220, 221

[56] References Cited

U.S. PATENT DOCUMENTS

| | | | |
|---|---|---|---|
| 3,733,133 | 5/1973 | Chapman | 359/220 |
| 3,797,908 | 3/1974 | Ward et al. | |
| 4,328,410 | 5/1982 | Slivinsky et al. | 219/121.8 |
| 4,670,638 | 6/1987 | Pavlin | 219/121.78 |
| 4,797,532 | 1/1989 | Maiorov | 219/121.78 |
| 4,830,261 | 5/1989 | Mello et al. | 219/121.78 |
| 4,887,019 | 12/1989 | Reis et al. | 359/220 |

FOREIGN PATENT DOCUMENTS

| | | | |
|---|---|---|---|
| 0055463 | 7/1982 | European Pat. Off. . | |
| 0131487 | 1/1985 | European Pat. Off. . | |
| 0176872 | 4/1986 | European Pat. Off. . | |
| 0262225 | 4/1988 | European Pat. Off. . | |
| 59-64188 | 4/1984 | Japan | 219/121.74 |
| 64-83394 | 3/1989 | Japan | 219/121.74 |
| 3-285785 | 12/1991 | Japan . | |

*Primary Examiner*—Geoffrey S. Evans
*Attorney, Agent, or Firm*—Oliff & Berridge

[57] ABSTRACT

Method and apparatus for bidirectionally oscillating a spot of a laser beam incident upon a workpiece to be processed with the laser beam, wherein the laser beam generated by a laser source is reflected by a movable reflecting mirror which is bidirectionally pivoted about a first axis by an oscillating actuator, so that the reflected laser beam is incident upon the workpiece. The apparatus includes a rotary support member which supports the mirror and the oscillating actuator and which is rotatable about a second axis perpendicular to the first axis, and a rotating actuator for rotating the rotary support member about the second axis during bidirectional oscillation of the spot of the laser beam incident upon the workpiece, to thereby change an oscillating direction of the beam spot.

15 Claims, 16 Drawing Sheets

METHOD AND SYSTEM FOR PROCESSING WORKPIECE WITH LASER SEAM, WITH OSCILLATION OF BEAM SPOT ON THE WORKPEIECE AND BEAM OSCILLATING APPARATUS

BACKGROUND OF THE INVENTION

1. Field of the Invention

The present invention relates to a method of oscillating a spot of a laser beam incident upon a workpiece for processing the workpiece, and a laser processing system adapted to practice the method and equipped with a laser beam oscillating apparatus for oscillating the laser beam spot.

2. Discussion of the Related Art

A laser processing system is known, wherein a workpiece is irradiated with a laser beam, to perform various processing operations such as welding, severing or cutting, hardening, and surface treatment or finishing which may involve removal of a material from the surface of the workpiece. Such laser processing system uses a high-energy laser beam which impinges a desired local portion of the workpiece and which permits local concentration of a laser beam for precision machining or other processing in a relatively small area of the workpiece with a comparatively high degree of accuracy. In some processing operations, a local portion of the workpiece to be processed extends in a given direction and has a predetermined width in the direction perpendicular to the direction of extension. In this case, the spot of the laser beam (hereinafter referred to as "beam spot") is moved in the direction of extension of the local portion to be processed, while at the same time the beam spot is oscillated at a predetermined frequency in the direction of width of the local portion. The oscillation of the beam spot takes the form of either reciprocating movements in a direction substantially parallel to the direction of width of the local portion, or rotating movements in a merry-go-round fashion within the width of the local portion. Where the local portion of the workpiece to be processed is curved, arcuate or annular, for example, the direction of the width of such curved, arcuate or annular local portion varies in the direction of extension, and the oscillating direction of the beam spot must be changed as the beam spot moves in the direction of extension. Accordingly, the laser processing system must be equipped with a laser beam oscillating apparatus capable of changing the oscillating direction of the beam spot on the workpiece as the processing progresses in the direction of extension of the local portion to be processed.

An example of laser beam oscillating apparatus of reciprocatory oscillation type is shown generally at 200 in FIG. 19. This apparatus 200 uses an X-axis oscillator mechanism 210 and a Y-axis oscillator mechanism 212 which include respective movable reflecting mirrors 202, 204 that are rotatable about respective axes. The reflecting mirrors 202, 204 are rotated by respective electromagnetic actuators 206, 208 about their axes as indicated by arrows in FIG. 19. The X-axis and Y-axis oscillator mechanisms 210, 212 are positioned relative to each other such that the axes of the two mirrors 202, 204 intersect each other.

An example of laser beam oscillating apparatus of rotary oscillation type is known as disclosed in JP-A-3-285785 (published on Dec. 16, 1991) wherein a condensing lens whose optical axis is offset from the axis of the laser beam is rotated about the optical axis, to rotate the beam spot.

The known laser beam oscillating apparatuses indicated above suffer from various drawbacks as described below. In the reciprocatory oscillation type apparatus of FIG. 19, the oscillating direction in which the beam spot is reciprocated is determined by cooperative operations of the X-axis and Y-axis oscillator mechanisms 210, 212. This means relatively complicated and difficult control of the two oscillator mechanisms to change the oscillating direction. Further, the spacial positioning of the two oscillator mechanisms requires a relatively large space for installation of the apparatus. Another drawback of the apparatus is a need of using a condensing convex lens having a relatively large focal length, since the laser beam L condensed by the condensing lens must be incident upon the two oscillator mechanisms disposed downstream of the condensing lens. In this respect, the light condensing efficiency is undesirably low in the apparatus of FIG. 19.

The laser beam oscillating apparatus of rotary oscillation type disclosed in the publication JP-A-3-285785 is disadvantageous in that the application of the apparatus is limited due to the rotating movements of the beam spot, that the apparatus cannot be used with a high-energy laser source since it is difficult to effectively cool the condensing lens rotated at a high speed, and that the light condensing device must use a lens and cannot use a metallic surface mirror, leading to comparatively short life expectancy and increased running cost.

SUMMARY OF THE INVENTION

It is therefore a first object of the present invention to provide a method of oscillating a laser beam spot, which is improved over the methods practiced by the known laser processing systems.

It is a second object of the invention to provide a laser beam oscillating apparatus of reciprocatory oscillation type for oscillating the laser beam spot, which apparatus is suitably used in the method of the invention indicated above and which is capable of solving at least one of the drawbacks of the known systems such as difficult control of beam oscillating device, large size, difficult condensing of the laser beam, incapability to use a high-energy laser source, and high running cost.

It is a third object of this invention to provide a laser processing system suitable for practicing the method indicated above.

The first object indicated above may be achieved according to a first aspect of this invention, which provides a method of reflecting a laser beam generated by a laser source, by using a movable reflecting mirror, and oscillating a spot of the reflected laser beam incident upon a workpiece for processing the workpiece, the method comprising the steps of: bidirectionally pivoting the movable reflecting mirror about a first axis at a predetermined frequency, and thereby bidirectionally oscillating the spot of the reflected laser beam incident upon the workpiece; and rotating the movable reflecting mirror about a second axis during bidirectional oscillation of the spot of the reflected laser beam, to thereby change an oscillating direction in which the spot of the reflected laser beam is bidirectionally oscillated, the second axis being perpendicular to the first axis.

The second object indicated above may be achieved according to a second aspect of the invention, which provides a laser beam oscillating apparatus for bidirectionally oscillating a spot of a laser beam incident upon a workpiece to be processed with the laser beam, the apparatus including a laser source for generating the laser beam, a movable reflecting mirror pivotable about a first axis, and an oscillating actuator for bidirectionally pivoting the movable reflecting mirror at a predetermined frequency, the laser beam generated by the laser source being reflected by the movable reflecting mirror and thereby incident upon the workpiece, the apparatus comprising: (a) a rotary support member supporting the movable reflecting mirror and the oscillating actuator, the rotary support member being rotatable about a second axis perpendicular to the first axis; and (b) a rotating actuator for rotating the rotary support member about the second axis during bidirectional oscillation of the spot of the laser beam incident upon the workpiece, to thereby change an oscillating direction in which the spot is bidirectionally oscillated.

The method indicated above can be suitably practiced by the apparatus constructed as described above. In the present apparatus, the movable reflecting mirror and the oscillating actuator are supported by the rotary support member which is rotatable about the second axis perpendicular to the first axis about which the mirror is bidirectionally pivoted by the oscillating actuator. The spot of the laser beam incident upon the workpiece is bidirectionally oscillated at the predetermined frequency by bidirectionally pivoting the mirror about the first axis, while at the same time the oscillating direction of the beam spot is changed by rotating the mirror with the rotary support member about the second axis.

In the present method and apparatus, the use of the single movable reflecting mirror not only permits easy control of the oscillating direction of the beam spot, but also makes it possible to reduce the size of the beam oscillating apparatus and utilize a concave mirror having a short focal length for condensing the laser beam received from the laser source. Accordingly, the laser beam can be condensed with higher efficiency, and the running cost of the apparatus can be lowered. Further, the absence of any convex lens for oscillating the laser beam permits the use of a high-energy laser beam, that is, the laser source having a high output capacity.

In the present method, an angular position of the movable reflecting mirror about the second axis may be changed as a function of a position of the spot of the reflected laser beam on the workpiece in a direction other than the oscillating direction, whereby the oscillating direction is changed as the position of the spot on the workpiece is changed in the direction other than the oscillating direction. Where the workpiece has an annular zone to be processed by the reflected laser beam, the angular position of the movable reflecting mirror may be controlled such that the oscillating direction is parallel to a radial direction of an annulus of the annular zone. In this case, an angle of pivoting of the movable reflecting mirror about the first axis may be determined such that a distance of bidirectional oscillation of the spot of the reflected laser beam is substantially equal to the width of the annular zone as measured in the radial direction thereof.

Where a portion of the workpiece to be processed is a generally elongated zone which has a predetermined width as measured in a direction perpendicular to a longitudinal direction thereof, the angular position of the movable reflecting mirror may be changed as a function of the position of the spot of the reflected laser beam on the workpiece in the longitudinal direction of the generally elongated zone, so that the oscillating direction is changed as the position of the spot on the workpiece is changed in the longitudinal direction. In this instance, an angle of pivoting the movable reflecting mirror about the first axis may be determined such that a distance of bidirectional oscillation of the spot of the reflected laser beam is substantially equal to a dimension of the generally elongated zone in the oscillating direction.

The third object indicated above may be achieved according to a third aspect of the present invention, which provides a laser processing system adapted to process an annular zone on the workpiece. The system comprises: (a) a laser beam oscillating apparatus constructed as described above; (b) a positioning device for positioning the workpiece; and (c) rotation control means for controlling the rotating actuator, to change an angular position of the rotary support member and thereby change an angular position of the movable reflecting mirror about the second axis, for thereby changing the oscillating direction such that the oscillating direction is parallel to a radial direction of an annulus of the annular zone.

One preferred form of the laser processing system further comprises initial angle control means for controlling the oscillating actuator to control an initial angle of the movable reflecting mirror about the first axis in relation to the angular position of the movable reflecting mirror about the second axis which is controlled by the rotation control means. The initial angle represents an initial angular position of the movable reflecting mirror about the first axis in which the spot of the laser beam incident upon the workpiece is located on an inner circumference of the annular zone before the movable reflecting mirror is pivoted to bidirectionally oscillate the spot of the laser beam in the radial direction of the annular zone. The initial angle control means cooperates with the rotation control means to move the spot of the laser beam along the annulus of the annular zone.

According to one advantageous arrangement of the above preferred form of the invention, the laser processing system further comprises oscillating angle control means for controlling the oscillating actuator to control an oscillating angle of the movable reflecting mirror about the first axis in relation to the angular position of the movable reflecting mirror about the second axis. The oscillating angle represents an angle of pivoting of the movable reflecting mirror about the first axis to bidirectionally oscillate the spot of the laser beam from the inner circumference of the annular zone. The oscillating angle control means is adapted to determine the oscillating angle such that a distance of bidirectional oscillation of the spot is substantially equal to a width of the annular zone as measured in the radial direction.

According to another advantageous arrangement of the above form of the invention, the laser processing system is adapted to process a plurality of annular zones which are spaced from each other. The system includes a plurality of laser beam oscillating apparatuses each constructed as described above, for simultaneously processing the plurality of annular zones, respectively, with the laser beams reflected by the movable reflecting mirrors of the respective laser beam oscillating apparatuses.

The third object indicated above may be achieved according to a fourth aspect of the present invention, which provides a laser processing system adapted to process a working zone on the workpiece, which zone has a predetermined width as measured in a direction perpendicular to a longitudinal direction thereof. The system comprises: (a) a laser beam oscillating apparatus constructed as described above; (b) a moving device for moving the workpiece and the laser beam oscillating apparatus relative to each other to move the spot of the laser beam incident upon the workpiece, within the working portion in the longitudinal direction; and (c) rotation control means for controlling the rotating actuator, to change an angular position of the rotary support member and thereby change an angular position of the movable reflecting mirror about the second axis, in relation to a relative position of the workpiece and the laser beam oscillating apparatus, for thereby changing the oscillating direction depending upon the relative position.

Where the working portion of the workpiece is an annular zone having a predetermined width as measured in a radial direction thereof, the rotation control means of the laser processing system described just above may be adapted to determine the angular position of the movable reflecting mirror about the second axis such that the oscillating direction is parallel to the radial direction of the annular zone. In this case, the system may include a plurality of laser beam oscillating apparatuses each constructed as described above to simultaneously process respective annular zones which are spaced from each other on the workpiece, by the laser beams reflected by the movable reflecting mirrors of the respective laser beam oscillating apparatuses.

The third object indicated above may also be achieved according to a fifth aspect of this invention, which provides a laser processing system adapted to process a generally elongated zone on the workpiece. The system comprises: (a) a laser beam oscillating apparatus as described above; (b) rotation control means for controlling the rotating actuator, to change an angular position of the rotary support member and thereby change an angular position of the movable reflecting mirror about the second axis; and (c) oscillating angle control means for controlling the oscillating actuator to control an oscillating angle of the movable reflecting mirror about the first axis in relation to the angular position of the movable reflecting mirror about the second axis. The oscillating angle represents an angle of pivoting of the movable reflecting mirror about the first axis to bidirectionally oscillate the spot of the laser beam within a width of the generally elongated zone as measured in a direction perpendicular to a longitudinal direction thereof. The oscillating angle control means may be adapted to determine the oscillating angle such that a distance of bidirectional oscillation of the spot is substantially equal to a width of the generally elongated zone. The oscillating angle control means cooperates with the rotation control means to move the spot of the laser beam incident upon the workpiece, within the generally elongated zone in the longitudinal direction.

The third object may also be achieved according to a sixth aspect of the present invention, which provides a laser processing system adapted to process an annular zone on the workpiece. The system comprises: (a) a laser beam oscillating apparatus as described above; (b) a beam-axis offset device disposed between the laser beam oscillating apparatus and the workpiece and rotatable about a rotation axis aligned with an axis of the laser beam incident upon the offset device, the offset device having an output position at which the incident laser beam is transmitted toward the workpiece and which is offset by a predetermined distance from the rotation axis; and (c) rotation control means for controlling the rotating actuator, to change an angular position of the rotary support member and thereby change an angular position of the movable reflecting mirror about the second axis in relation to an angular position of the offset device about the rotation axis, for thereby changing the oscillating direction such that the oscillating direction is parallel to a radial direction of an annulus of the annular zone.

BRIEF DESCRIPTION OF THE DRAWINGS

The above and optional objects, features and advantages of the present invention will be better understood by reading the following detailed description of presently preferred embodiments of the invention, when considered in conjunction with the accompanying drawings, in which.

DETAILED DESCRIPTION OF THE PREFERRED EMBODIMENTS

Figure 1:
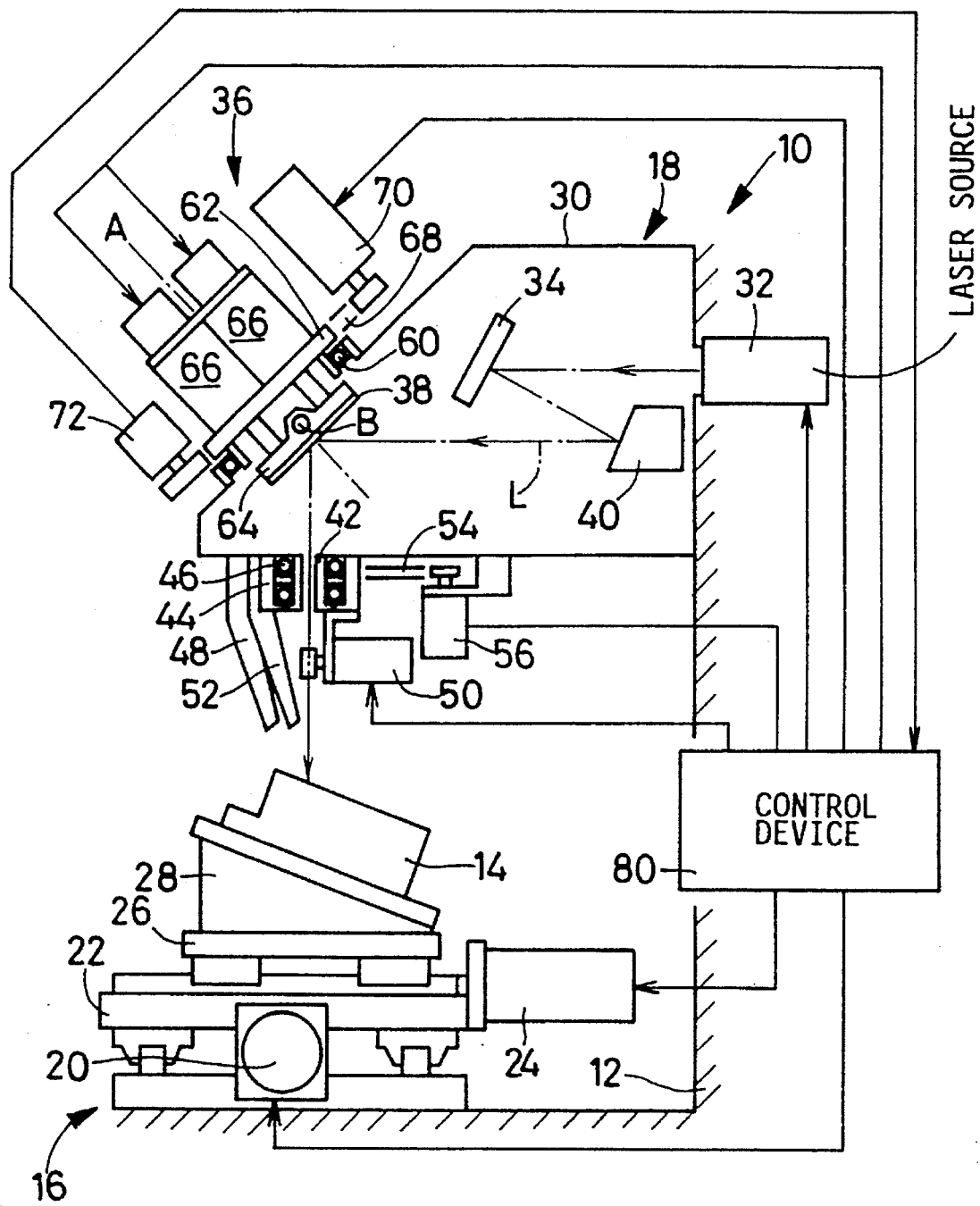
FIG. 1 is a schematic block diagram of a laser processing system incorporating one embodiment of a laser beam oscillating apparatus of the present invention.
Figure 3:
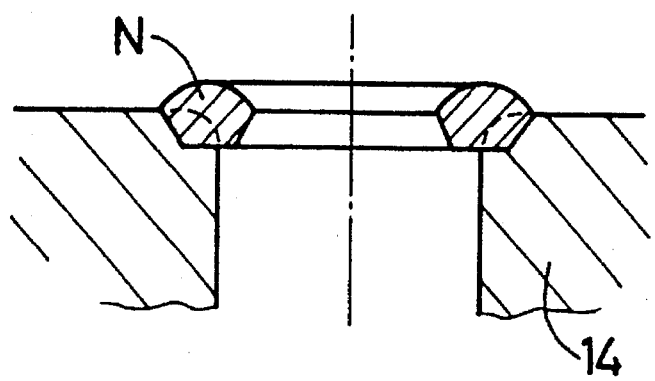
FIG. 3 is a view illustrating a cladding formed by welding on a workpiece in the laser processing system of FIG. 1.

Referring first to FIG. 1, there is illustrated a laser processing system 10 constructed according to one embodiment of the present invention. The laser processing system 10 is adapted to perform a welding operation for forming a metal cladding N on a workpiece 14 as shown in FIG. 3. The system 10 includes an X-Y table 16 mounted on a machine frame 12, and a laser head 18 which is located above X-Y table 16 and is also mounted on the frame 12. The X-Y-table 16 is provided to support the workpiece 14 such that the workpiece 14 is movable in X-axis and Y-axis directions that are perpendicular to each other.

The X-Y table 16 includes a Y-axis slide 22 which is fed and positioned by a Y-axis feed motor 20 in the Y-axis direction, and an X-axis slide 26 which is fed and positioned by an X-axis feed motor 24 in the X-axis direction. On the X-axis slide 26 of the X-Y table 16, there is mounted a positioning jig 28 on which the workpiece 14 is positioned and fixed.

The laser head 18 has a laser source 32, a stationary reflecting mirror 34 and a condensing concave mirror 40, which are fixed to a housing 30. A laser beam L generated by the laser source 32 is received by the stationary mirror 34, which in turn reflects the received laser beam L toward the condensing concave mirror 40, which in turn reflects the laser beam L toward a movable reflecting mirror 38 of a beam oscillating device 36. The laser beam L reflected by the movable reflecting mirror 38 is transmitted through an emission sleeve 42 fixed to the housing 30, and impinges on the workpiece 14.

The emission sleeve 42 rotatably supports an annular member 44 through a bearing 46. The annular member 44 carries an inert gas supply nozzle 48 and a powder supply nozzle 52. The inert gas supply nozzle 48 is adapted to inject an inert gas toward a laser-irradiated portion of the workpiece 14, while the powder supply nozzle 52 is adapted to receive a powder of a metal from a powder feeder 50 and deliver the metal powder onto the laser-irradiated portion of the workpiece 14. The metal powder is fused by the laser beam L, so as to form the annular metal cladding N on the workpiece 14 as shown in FIG. 3. In operation, the powder feeder 50 is arranged to feed the metal powder at a predetermined constant rate. The annular member 44 is connected through a belt 54 to a motor 56, so that the nozzles 48, 52 are rotated about the axis of the annular member 44, such that the nozzles 48, 52 are moved with the spot of the laser beam L on the laser-irradiated surface of the workpiece 14.

The beam oscillating device 36 of the laser head 10 constitutes a major portion of a laser beam oscillating apparatus incorporated in the system 10. The device 36 includes a rotary support member 62 which is mounted on the housing 30 through a bearing 60 rotatably about an axis A. This axis A is inclined by about 45 degrees with respect to the vertical. To the rotary support member 62, there is connected a pivotable mirror holder 64 which carries the movable reflecting mirror 38 fixed thereto. The mirror holder 64 is pivotable about an axis B which is perpendicular to the axis A of the rotary support member 62. The beam oscillating device 36 further includes an oscillating actuator in the form of a pair of electromagnetic oscillators 66 secured to the rotary support member 62. The oscillators 66 function to periodically and bidirectionally pivot the movable reflecting mirror 38 about the axis B, to deflect the laser beam for thereby bidirectionally oscillating the spot of the laser beam L on the workpiece 14. The rotary support member 62 is connected by a belt 68 to a rotating actuator in the form of a motor 70 so that the movable reflecting mirror 38 is rotated about the axis A. An angle sensor 72 is connected to the rotary support member 62, for detecting an angle of rotation of the member 62 about the axis A.

Figure 2:
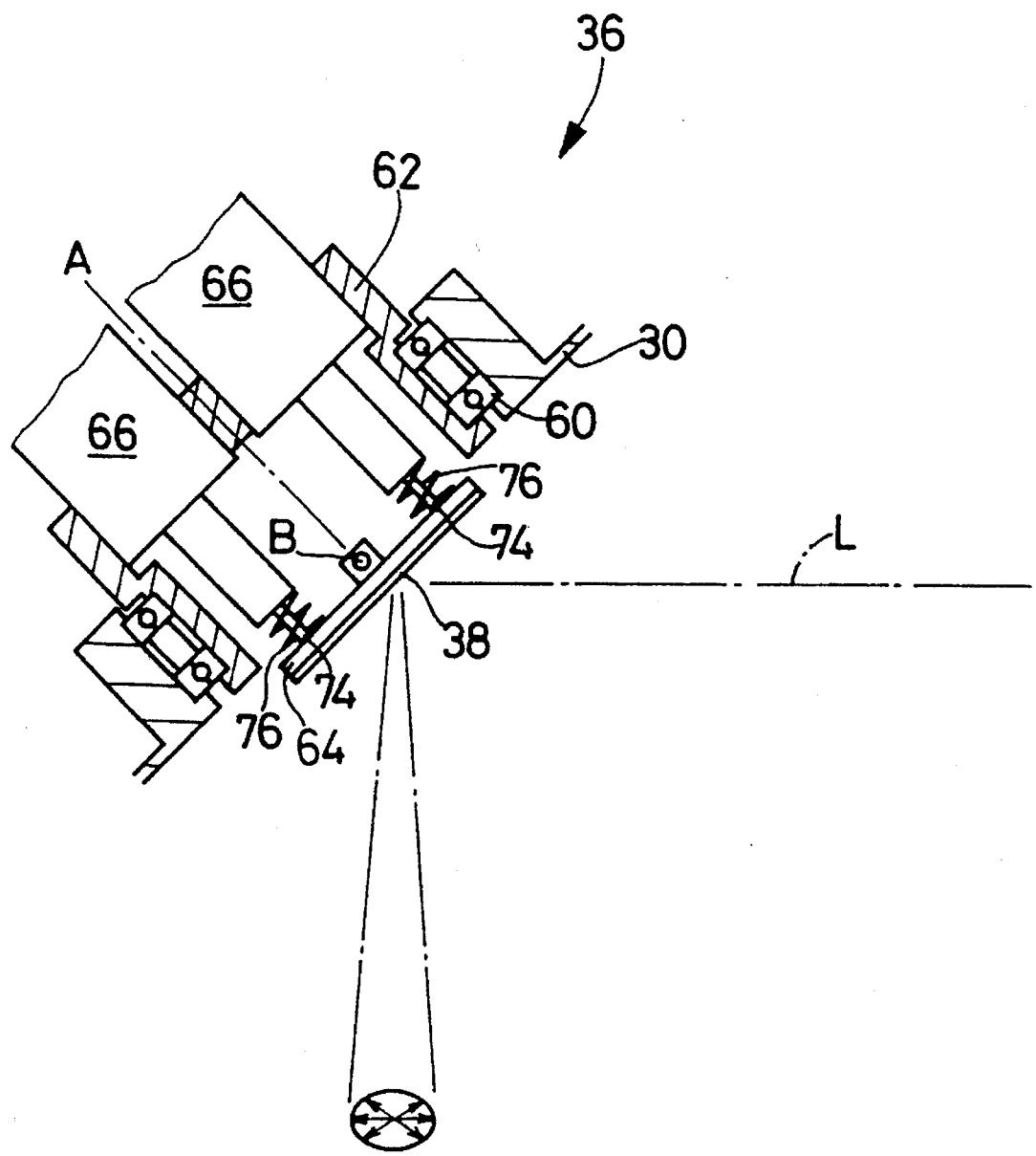
FIG. 2 is an enlarged view of the laser beam oscillating apparatus of FIG. 1, for explaining an operation of the apparatus.

The mirror holder 64 and the electromagnetic oscillator 66 are constructed as disclosed in JP-A-4-170511. As shown in FIG. 2, the oscillator 66 has respective actuator shafts 74 extending therethrough. The shafts 74 are connected at their ends with the mirror holder 64 through respective springs 76, which are interposed therebetween so as to surround the end portions of the shafts 74.

In the beam oscillating device 36, the movable reflecting mirror 38 and the electromagnetic oscillators 66 are supported by the rotary support member 62 which is rotatable about the axis A (second axis) which lies in a plane perpendicular to the axis B (first axis) about which the mirror 38 is pivoted. When the reflecting mirror 38 is bidirectionally pivoted about the axis B by the electromagnetic oscillators 66 at a given frequency, the spot of the laser beam L (hereinafter referred to as "beam spot") on the workpiece 14 is bidirectionally oscillated at the same frequency as indicated by arrows in FIG. 2. The direction of oscillation of the beam spot is determined by the angular position of the mirror 38 about the axis A. That is, the direction in which the beam spot is oscillated by the pivotal movements of the mirror 38 about the axis B can be changed by rotation the mirror 38 about the axis A by the motor 70.

It will be understood that the use of the single movable reflecting mirror 38 not only permits easy control of the oscillating direction of the beam spot, but also makes it possible to reduce the size of the beam oscillating apparatus 36 and utilize the condensing concave mirror 40 having a short focal length, which facilitates the condensing of the laser beam and reduces the running cost of the processing system 10. Further, the oscillating device 36 does not use a convex lens for oscillating the laser beam, and therefore permits the use of a high-energy laser beam, that is, the laser source 32 having a high output capacity.

While only one laser head 18 constructed as described above is shown in FIG. 1, two or more laser heads 10 may be arranged such that the laser heads 18 are spaced from each other in the direction parallel to the Y-axis of the X-Y table 16, that is, in the direction perpendicular to the plane of the view of FIG. 1. The spacings between the adjacent laser heads 18 are determined by the distances between the corresponding adjacent working portions of the workpiece 14 to be processed. For processing different workpieces having different working portions to be processed, suitable mechanisms may be provided for supporting the laser heads 18 movably relative to each other to adjust the spacings between the adjacent laser heads 18 so that the laser heads 18 may be aligned with the respective working portions.

A control device 80 is provided to control the laser source 32, electromagnetic oscillators 66 and motor 70 of the beam oscillating device 36, powder feeder 50, motor 56, and the motors 20, 24 of the X-Y table 16. The control device 80 includes a so-called microcomputer incorporating a central processing unit (CPU), a random-access memory (RAM) and a read-only memory (ROM). The CPU operates according to input signals and control programs stored in the ROM while utilizing a temporary data storage function of the RAM, to control the X-Y table 16 to suitably position the workpiece 14, and control the electromagnetic oscillators 66 and motors 56, 70 for regulating the oscillating direction and width or distance of the beam spot on the workpiece 14, and suitably moving the inert gas and powder supply nozzles 48, 52, while the local portions of the workpiece 14 are irradiated with or exposed to the laser beam L generated by the laser source 32.

Figure 4:
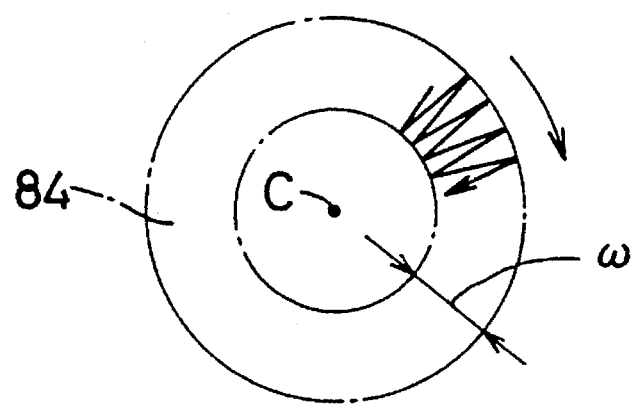
FIG. 4 is a view for explaining a path of a laser beam spot in the apparatus of FIG. 1, and a laser-irradiated zone defined by the path of the laser beam spot.
Figure 8:
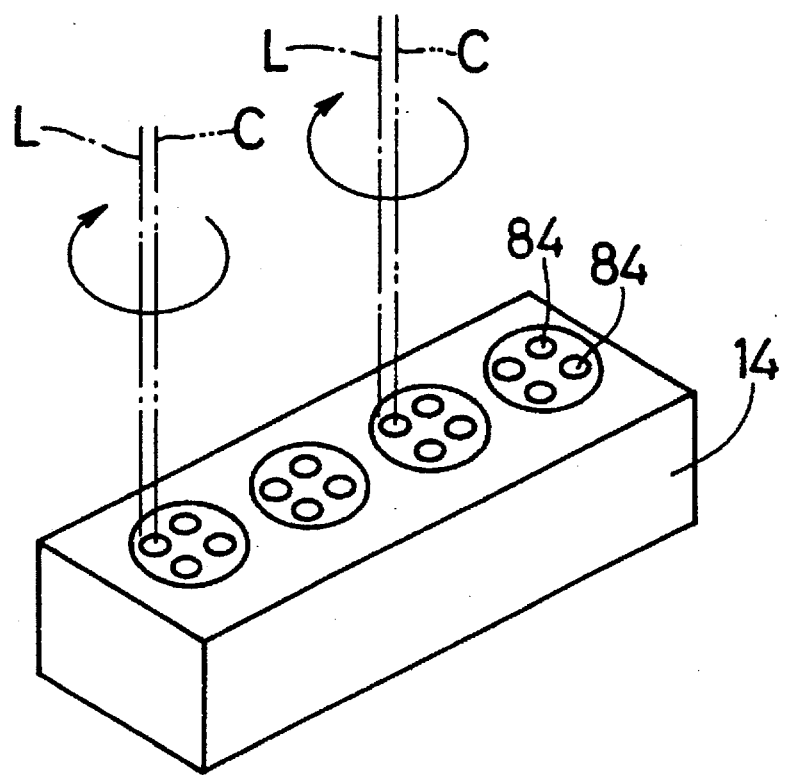
FIG. 8 is a view for explaining an advantage of the embodiment of FIG. 5.

In the present specific example, the workpiece 14 is a cylinder head of an internal combustion engine, which has working portions each having four local portions 84 to be processed, as indicated in FIG. 8. Each local portion 84 is an annular zone which provides a seat for a shut-off valve, after the annular zone is irradiated with the laser beam L to form the annular cladding N as shown in cross section by hatching in FIG. 3. Described in detail, the annular zone 84 shown in enlargement in FIG. 4 is provided with a metal powder delivered from the powder supply nozzle 52, which is heated and fused by the laser beam L in the atmosphere of the inert gas injected from the inert gas supply nozzle 48. As is apparent from FIG. 4, the annular zone 84 to be irradiated by the laser beam L has a width W defined by the inner and outer diameters, which width W may be about 6–7 mm, for example. In other words, the annular zone 84 to be processed has the predetermined width W as measured in the radial direction. To irradiate this annular zone 84, the spot of the laser beam L or the beam spot is reciprocatingly or bidirectionally oscillated in a zigzag manner substantially in the radial direction of the annulus of the zone 84, as indicated in FIG. 4, so that the irradiation of the zone 84 progresses in a predetermined circumferential direction of the annulus, as indicated by arrow in FIG. 4. Thus, the annular cladding N of FIG. 3 is formed of the metal powder fused under heat by the laser beam L, as well known in the art.

Referring next to the flow chart of FIG. 5, there will be described an operation of the laser processing system 10 under the control of the control device 80.

The operation is initiated with step SA1 in which the workpiece 14 clamped on the jig 28 on the X-Y table 16 is positioned at a predetermined initial position in which the center C of each annular zone 84 on the workpiece 14 is aligned with the axis of rotation of the emission sleeve 42. Step SA1 is followed by step SA2 in which the laser source 32 is activated to generate the laser beam L, while the powder feeder 50 is activated to deliver the metal powder from the powder supply nozzle 52 onto the predetermined position in the annular zone 84. Then, the control flow goes to step SA3 in which the motor 70 is operated to rotate the movable reflecting mirror 38 of the beam oscillating device 36 about the axis A by a predetermined small angle $\Delta\theta_A$, while at the same time the motor 56 is operated to rotate the inert gas and powder supply nozzles 48, 52 by the corresponding angle. The angular position of the reflecting mirror 38 about the axis A thus established determines the oscillating direction of the beam spot, parallel to the radial direction of the annulus of the annular zone 84, as indicated by arrows in FIG. 4. The oscillating direction is changed 360° when the reflecting mirror 38 is rotated by one full turn about the axis A.

Then, the control flow goes to steps SA4 and SA5 to calculate an oscillating angle $\theta_{BO}$ and an initial angle $\theta_{BI}$ of the reflecting mirror 38 on the basis of the current angular position of the mirror 38 with respect to a reference position (initial position) in the circumferential or rotating direction. The current angular position of the mirror 38 is determined by a cumulative angle of rotation $\theta_A$ of the mirror 38 by the motor 70, which cumulative angle is a multiple of the predetermined increment angle $\Delta\theta_A$ by which the mirror 38 is rotated about the axis A in step SA3 each time the routine of FIG. 5 is executed. The oscillating angle $\theta_{BO}$ is an angle of pivoting of the mirror 38 about the axis B to oscillate the beam spot by a distance equal to the width W of the annular zone 84. This oscillating angle $\theta_{BO}$ is calculated as a function of the cumulative angle $\theta_A$ of the mirror 38, according to a predetermined relationship in the form of a functional equation $\theta_{BO}=f(\theta_A)$ or corresponding data map stored in the ROM. On the other hand, the initial angle $\theta_{BI}$ corresponds to a distance between the center C and the inner circumference (inside circle) of the annulus 84. In other words, the initial angle $\theta_{BI}$ represents the initial angular position of the mirror 38 about the axis B before the mirror 38 is pivoted to oscillate the beam spot over the distance W. In this initial angular position, the spot of the laser beam L is located on an inner circumference of the annular zone 84 before the mirror 38 is pivoted to oscillate the beam spot. This initial angle $\theta_{BI}$ is also calculated as a function of the cumulative angle $\theta_A$ of rotation of the mirror 38 about the axis A, according to a predetermined relationship in the form of a functional equation $\theta_{BI}$ or corresponding data map stored in the ROM. With the oscillating and initial angles $\theta_{BO}$ and $\theta_{BI}$ thus determined for each increment angle $\Delta\theta_A$, the beam spot is reciprocated or bidirectionally oscillated so as to cover the width W of the annular zone 84, and is moved generally in the circumferential direction of the annular zone 84 to irradiate the zone 84 with the laser beam L.

Step SA5 is followed by step SA6 in which the electromagnetic actuators 66 are operated according to the calculated angles $\theta_{BI}$ and $\theta_{BO}$ to periodically pivot the mirror 38 about the axis B by the angle $\theta_{BO}$, for oscillating the beam spot over the distance corresponding to the width W (determined by $\theta_{BI}$ and $\theta_{BO}$), in the radial direction corresponding to the current cumulative angle of rotation $\theta_A$ of the mirror 38 about the axis A.

Then, the control flow goes to step SA7 to determine whether the beam spot has reached a predetermined position at which the laser beam irradiation is terminated. In the present embodiment, the zone 84 to be irradiated is annular, step SA7 is to determine whether the mirror 38 has been rotated one full turn (through 360° about the axis A, namely, whether the mirror 38 has returned to the reference or initial angular position at which the irradiation of the workpiece 14 was initiated in the first cycle of execution of the routine of FIG. 5. Usually, a negative decision (NO) is obtained in step SA7, and the control flow returns to step SA3 and implement steps SA3 through SA6 again. Thus, steps SA3 through SA7 are repeatedly implemented to successively irradiate respective circumferential segments or fractions of the annular zone 84, in the circumferential direction of the annular zone 84 as indicated by arrow in FIG. 4, while the beam spot is oscillated in the radial direction over the width W for each segment or fraction. Since the motor 56 is operated to rotate the annular member 44 in synchronization with the motor 70 as the mirror 38 is rotated about the axis A to move the beam spot in the rotating direction, the inert gas supply nozzle 48 and the powder supply nozzle 52 are moved with the beam spot. The nozzles 48 and 52 are positioned so that the metal powder is delivered from the nozzle 52 onto the annular zone 84, at a position PF indicated in FIG. 6, which is spaced a short distance from a position LL of the beam spot, while the inert gas supply nozzle 48 is located as indicated in FIG. 6, with respect to the beam spot position LL. The position PF is upstream of the beam spot position LL, that is, spaced from the beam spot position LL in the direction in which the beam spot is moved to irradiate the annular zone 84, while the inert gas supply nozzle 48 is located downstream of the beam spot position LL so that the inert gas is delivered to the beam spot from the downstream side toward the upstream side of the beam spot position LL. Steps SA3 through SA7 are repeatedly implemented with a cycle time which is determined so that the beam spot is oscillated over the width W at a predetermined frequency, for example, several hundreds Hz.

Figure 7:
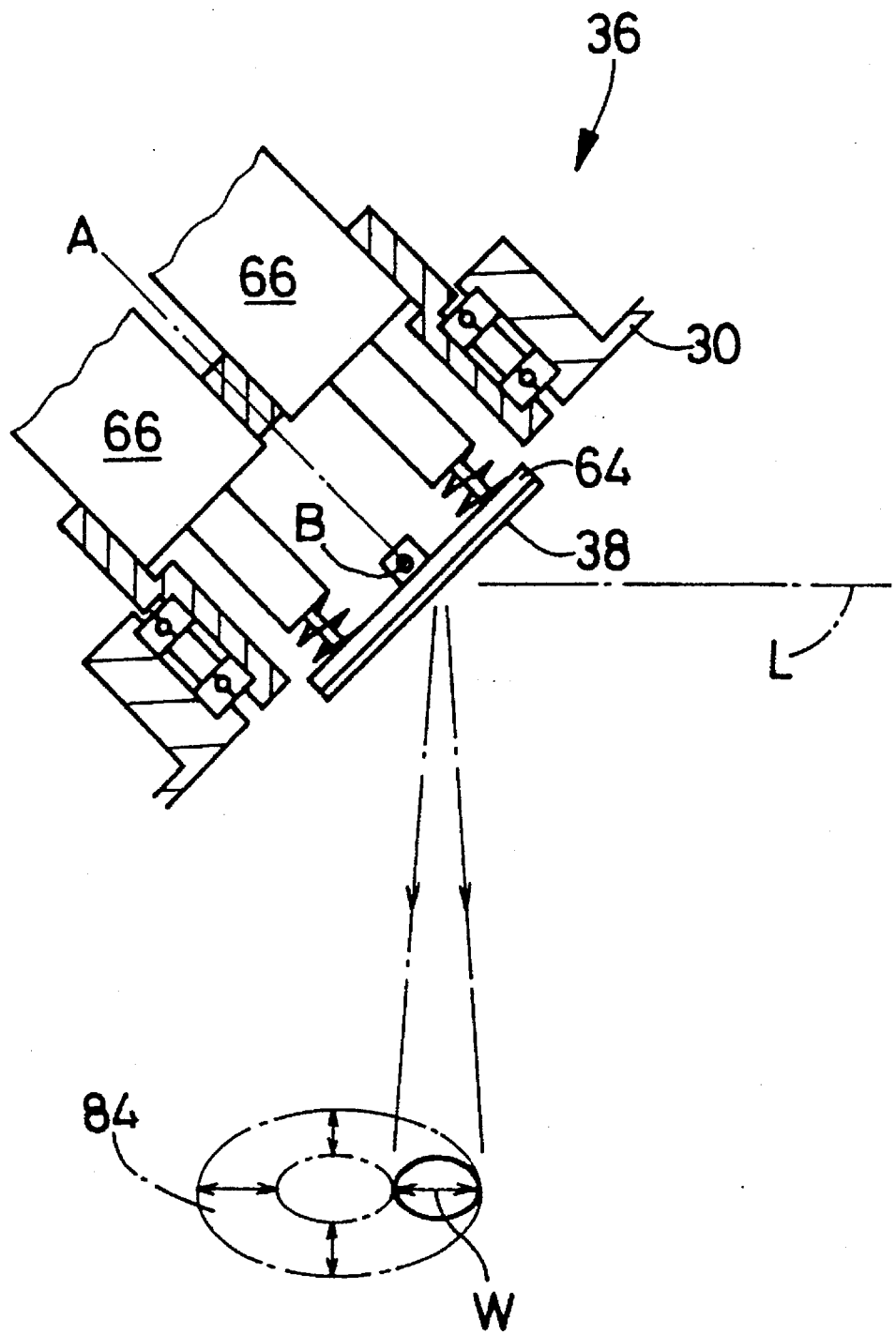
FIG. 7 is a view for explaining an operation of the laser beam oscillating apparatus controlled by a control device provided in the system of FIG. 1.

If an affirmative decision (YES) is obtained in step SA7, the control flow goes to step SA8 to turn off the laser source 32 and the powder feeder 50 to stop the irradiation of the workpiece 14 and the delivery of the powder from the nozzle 52. Thus, an operation to form the annular cladding N is performed to provide a valve seat in each annular zone 84 on the workpiece 14 as indicated in FIG. 7, while the movable reflecting mirror 38 is rotated about the axis A through 360°. FIG. 7 shows the four different oscillating directions of the beam spot corresponding to 0°, 90°, 180° and 270° positions of the mirror 38. The oscillating distance or width W is determined by the oscillating and initial angles $\theta_{BO}$ and $\theta_{BI}$ as described above.

As described above, the present embodiment is capable of reciprocating the beam spot over the predetermined distance W at each angular or circumferential position of the annular zone 84, without having to operate the X-Y table for moving the workpiece 14 during operation of each laser head 10, and without using a beam-axis offset device as described below.

Since the workpiece 14 is held stationary on the X-Y table 16 during the operation of the laser heads 18, all the working portions of the workpiece 14 in the form of the four annular zones 84 can be simultaneously processed by the laser beams L generated by the respective laser heads 18, whereby the production efficiency of the present laser processing system 10 can be improved. In this respect, it is noted that the control device 80 is used for all the laser heads 18. Each of the laser heads 18 includes the beam oscillating device 36, It will be understood that the beam oscillating device 36 and the control device 80 constitute an apparatus for oscillating or deflecting the laser beam L to thereby oscillate the beam spot on the workpiece 14, and that the control device 80 serves as means for controlling the laser source 32, means for controlling the motor 70 for rotating the mirror 38 about the axis A, means for controlling the electromagnetic actuators 66 to rotate the mirror 38 about the axis B, means for controlling the motor 56 to change the positions of the inert gas and powder supply nozzles 48, 52, means for controlling the powder feeder 50, and means for controlling the X-Y table 16.

Other embodiments of this invention will be described. In these embodiments, the same reference numerals as used in the first embodiment of FIGS. 1–8 will be used to identify the functionally corresponding components, and no redundant description of these components will be provided in the interest of brevity and simplification.

Figure 9:
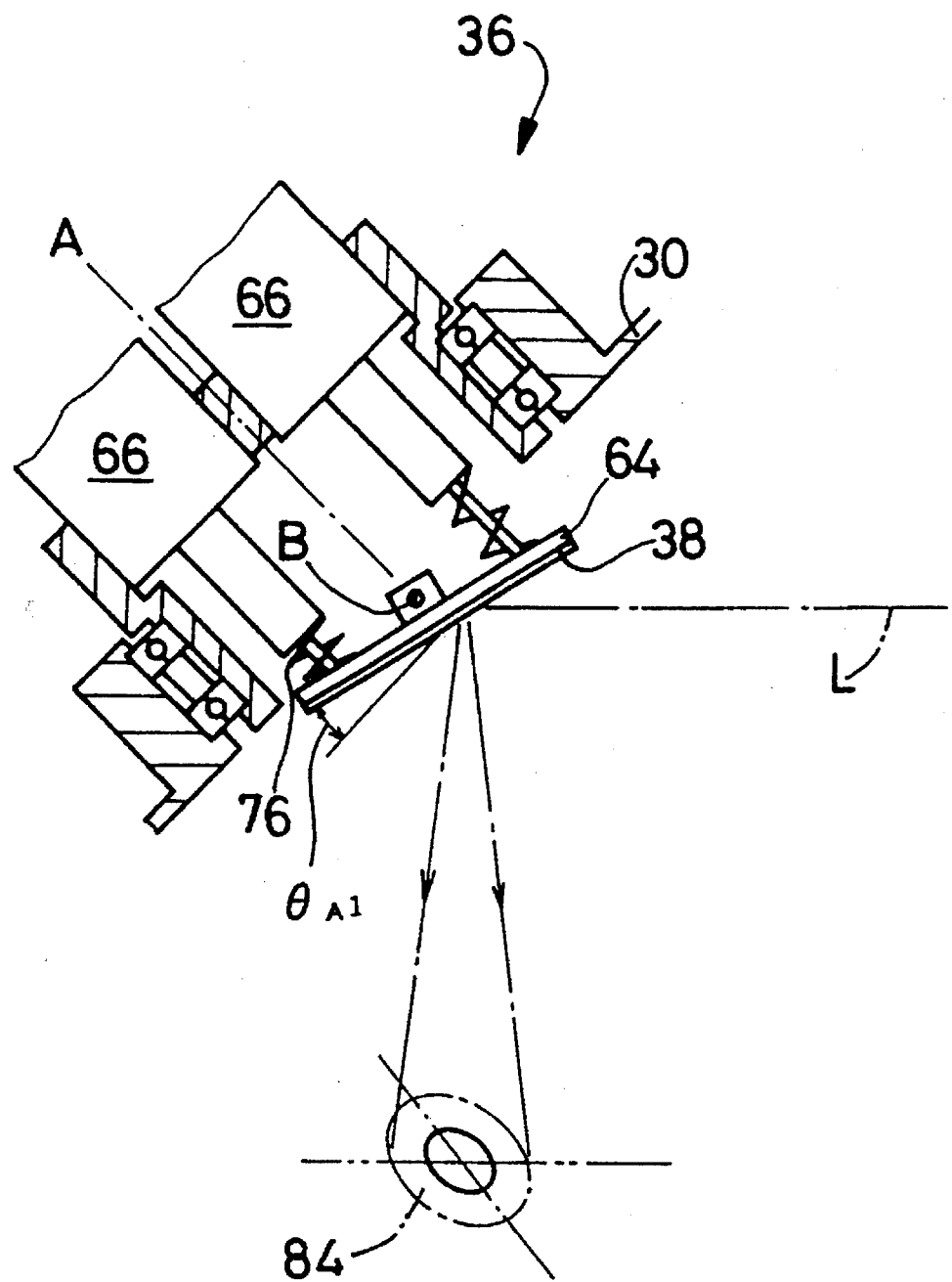
FIG. 9 is a view illustrating another embodiment of the laser beam oscillating apparatus of this invention and explaining an operation of this apparatus.
Figure 10:
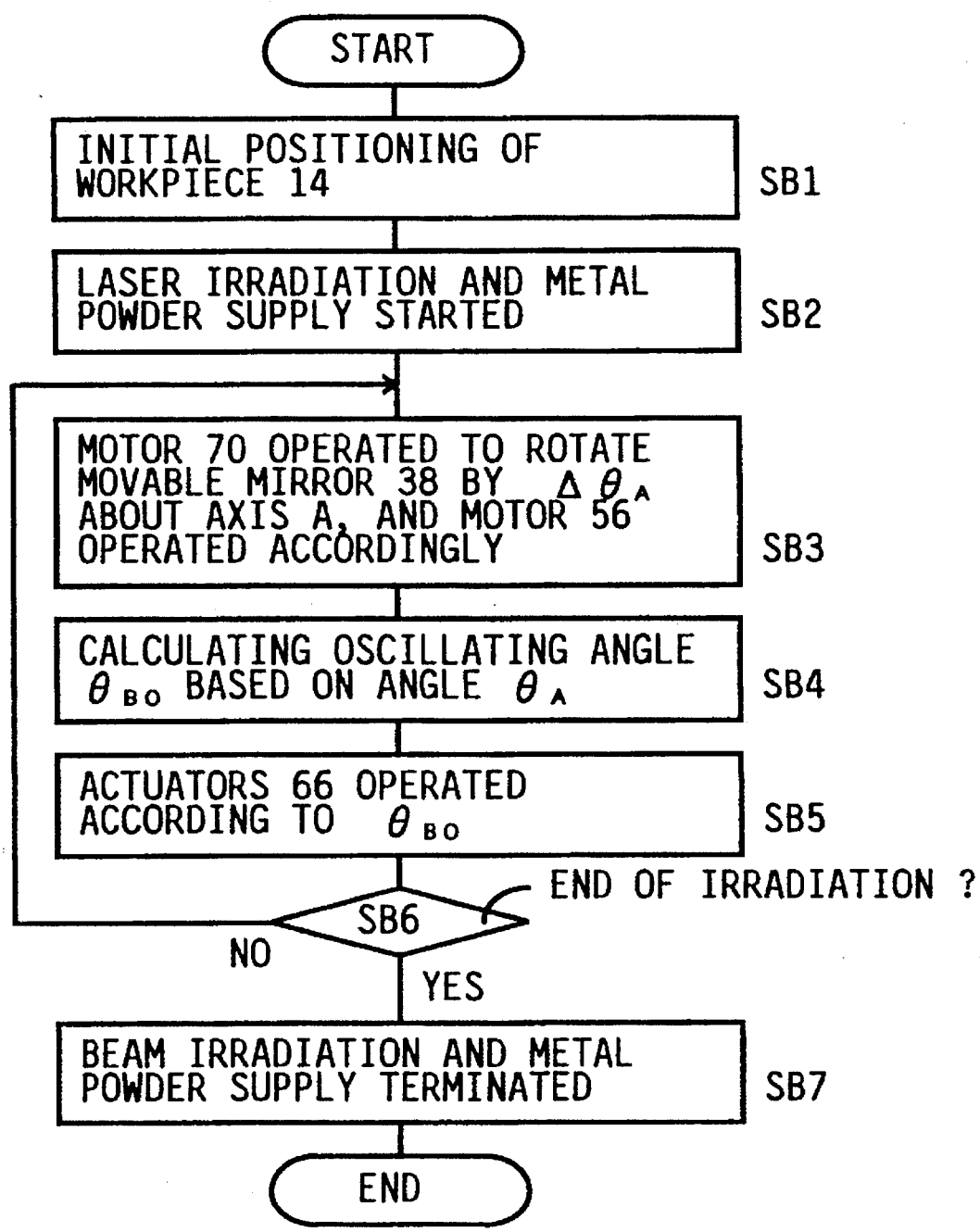
FIG. 10 is a flow chart illustrating an operation of the apparatus of FIG. 9.

Referring to FIGS. 9 and 10, there is shown a beam oscillating device 36 used in the second embodiment of the invention, wherein the plane of the movable reflecting mirror 38 is inclined by a predetermined angle $\theta_{A1}$ with respect to a plane perpendicular to the axis A, as indicated in FIG. 9. This angle of inclination $\theta_{A1}$ is determined by the mechanical elements such as the springs 76 of the device 36, so that the spot of the laser beam L reflected by the mirror 38 takes a path along the annulus of the annular zone 84 to be processed.

In the present second embodiment, the control device 80 operates as illustrated in the flow chart of FIG. 10. The routine of FIG. 10 is different from that of FIG. 5 of the first embodiment, in that the initial angle $\theta_{BI}$ of the reflecting mirror 38 is neither calculated nor controlled in the routine of FIG. 10. In the other aspects, the routine of FIG. 10 is identical with that of FIG. 5. In the present embodiment, too, the spot of the laser beam L is moved in the circumferential direction of the annular zone 84 to be processed, while the beam spot is reciprocated over the predetermined distance in the radial direction at each angular or circumferential position, so as to perform a welding operation to form a cladding using a metal powder as in the first embodiment. The present second embodiment provides the same advantages as the first embodiment. In addition, the second embodiment is advantageous in that the initial angle $\theta_{BI}$ need not be controlled. While the zone 84 is referred to as the annular zone in this second embodiment, the cladding to be formed cannot have a high degree of roundness, namely, tends to be more or less elliptical. However, this cladding is practically acceptable in some applications.

Figure 11:
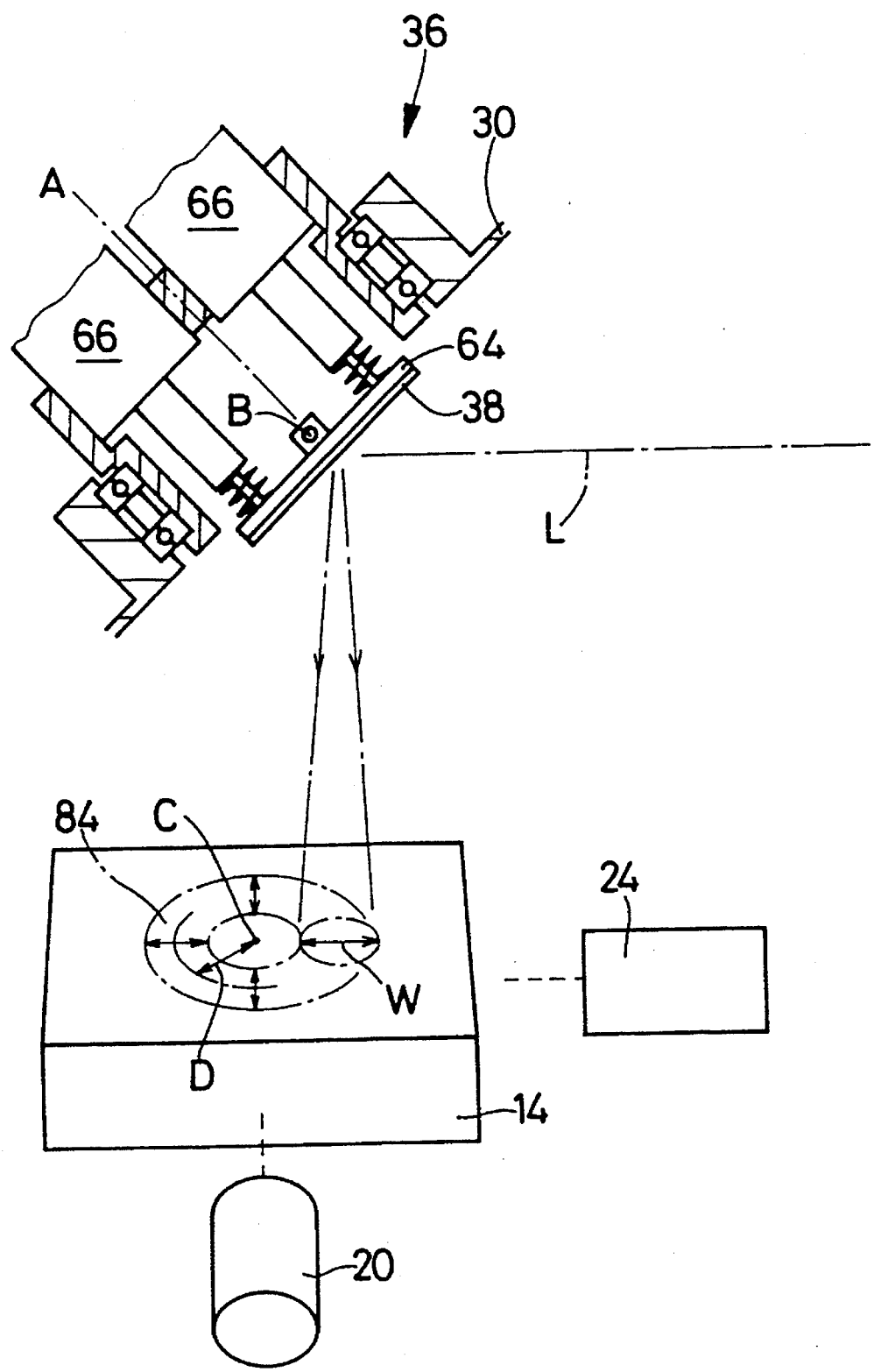
FIG. 11 is a view corresponding to that of FIG. 9, showing a further embodiment of the present invention.
Figure 12:
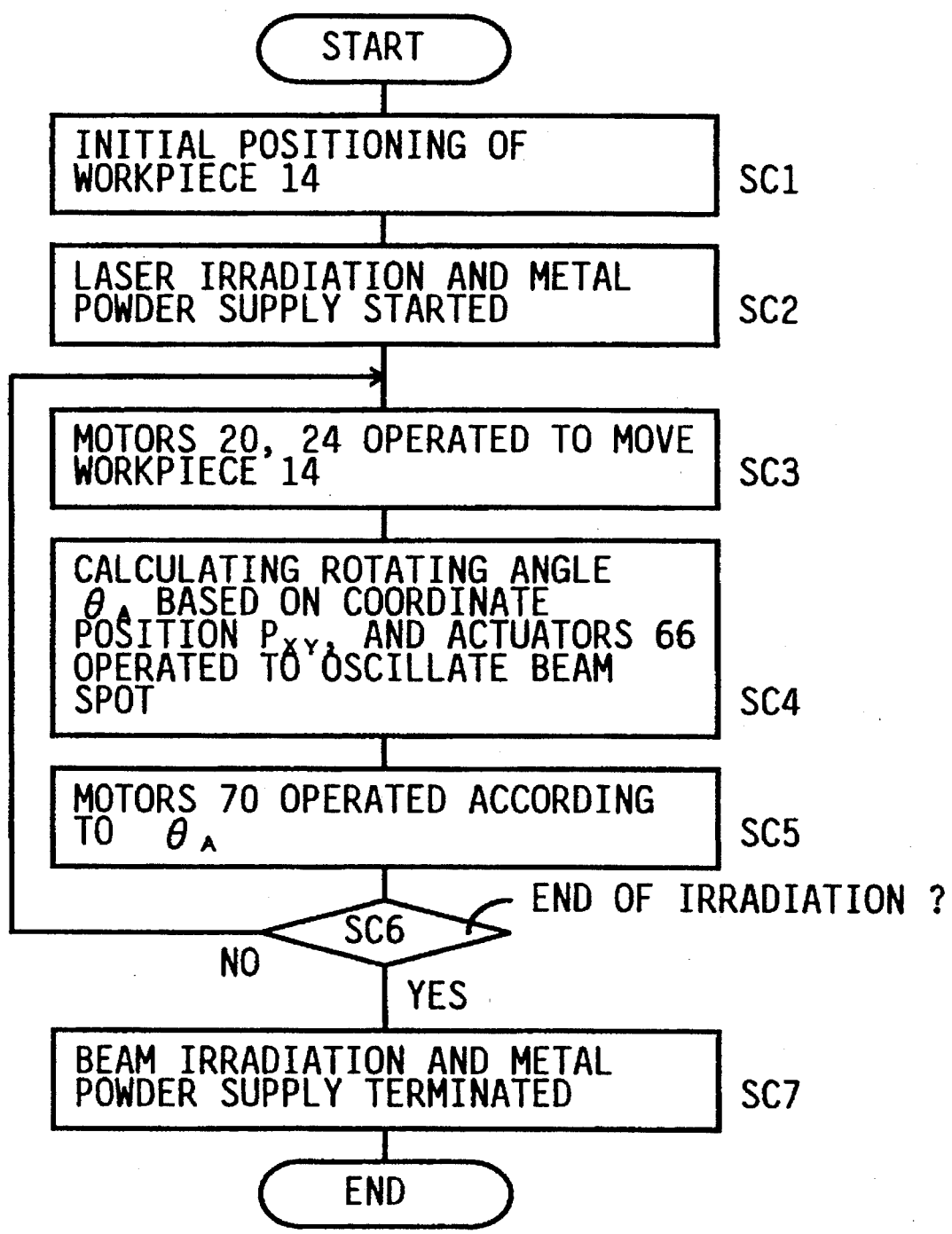
FIG. 12 is a flow chart illustrating an operation of the apparatus of FIG. 11.

Referring next to FIGS. 11 and 12, there is shown a third embodiment of the invention, wherein the zone 84 to be processed is irradiated with the laser beam L while the workpiece 14 is moved by the X-Y table 16 along the X and Y axes. Described in detail by reference to the flow chart of FIG. 12, the routine illustrated therein is initiated with step SC1 and SC2 identical with steps SA1 and SA2, to position the workpiece 14 at the predetermined initial position and turn on the laser source 32 and powder feeder 50. Step SC2 is further adapted to control the electromagnetic actuators 66 so that the movable reflecting mirror 38 is bidirectionally pivoted about the axis B by a predetermined angle $\theta_{BO1}$ to oscillate the beam spot at a predetermined frequency over the distance equal to the width W of the annular zone 84. Namely, the oscillating angle $\theta_{BO1}$ corresponds to the width W. Step SC2 is followed by step SC3 in which the X-axis and Y-axis feed motors 24 and 20 are operated to move the workpiece 14 by a predetermined incremental distance along a predetermined path, that is, along the annulus of the annular zone 84 or in the circumferential direction of the zone 84. That is, the workpiece 14 is moved along the X and Y axes to a predetermined point whose X and Y coordinate values are calculated according to an appropriate equation for circular interpolation.

Then, the control flow goes to step SC4 to calculate the rotating angle $\theta_A$ of the mirror 38 about the axis A, on the basis of the current coordinate position P of the workpiece 14, and according to a predetermined relationship in the form of a functional equation $\theta_A = f(P_{xy})$ or corresponding data map stored in the ROM of the control device 80. With the rotating angle $\theta_A$ thus determined for each coordinate position $P_{xy}$, the oscillating direction of the beam spot is changed depending upon the angular or circumferential position of the annular zone 84 at which the beam spot is oscillated in the radial direction indicated in FIG. 11.

Step SC4 is followed by step SC5 in which the motor 70 is operated to rotate the mirror 38 about the axis A by the calculated angle $\theta_A$. Then, step SC6 identical with step SA7 of FIG. 5 is implemented. Steps SC3 through SC6 are repeatedly implemented until an affirmative decision (YES) is obtained in step SC6. Thus, the beam spot is moved in a predetermined circumferential direction of the annular zone 84 while the beam spot is reciprocated at each predetermined angular or circumferential position (each coordinate position $P_{xy}$ determined in step SC4) of the zone 84. In the present embodiment, too, the motor 56 is operated in synchronization with the motor 70 to deliver the metal powder and inert gas, as described above with respect to the first embodiment by reference to FIG. 6.

Figure 5:
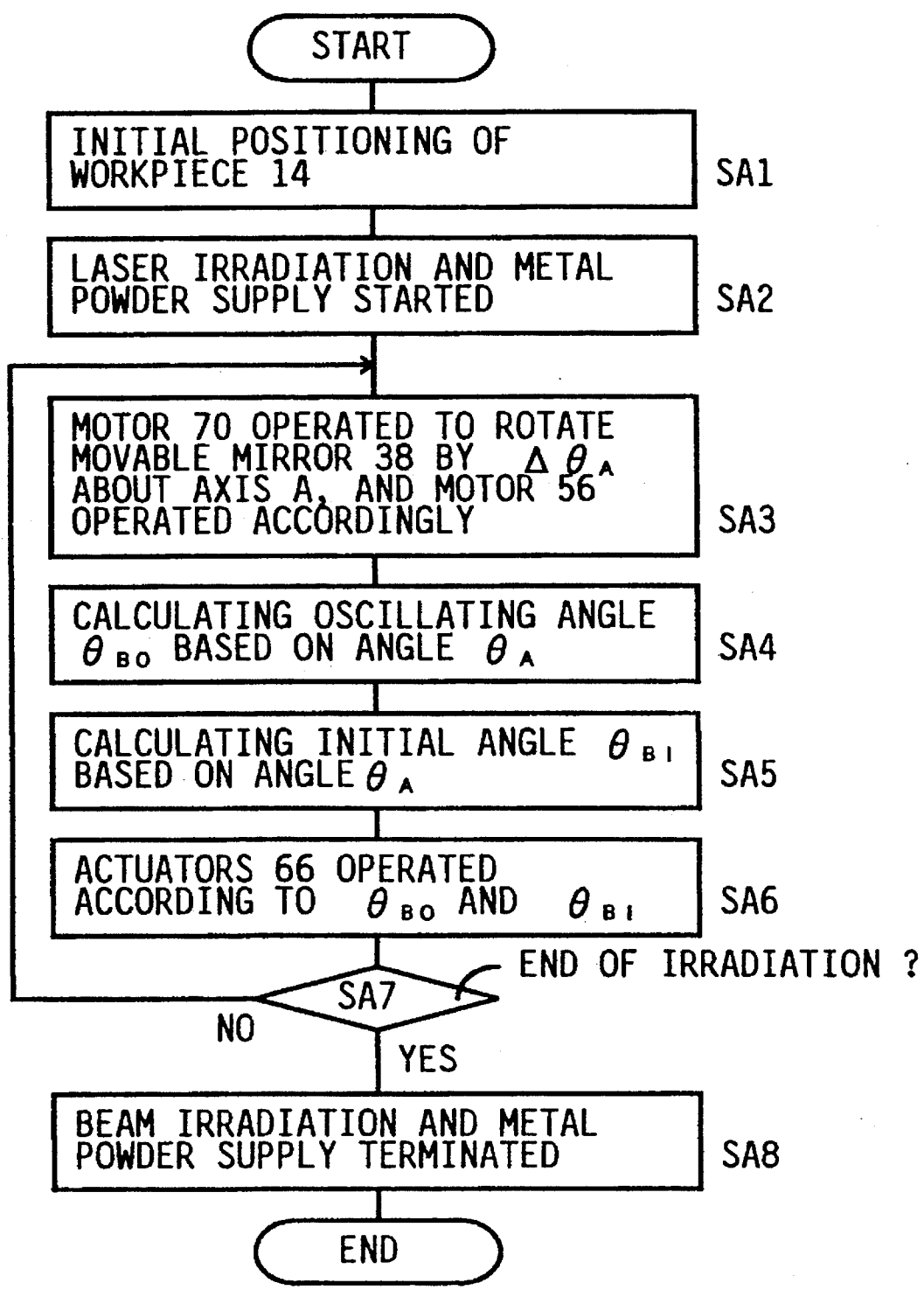
FIG. 5 is a flow chart illustrating an operation of the laser processing system of FIG. 1.
Figure 6:
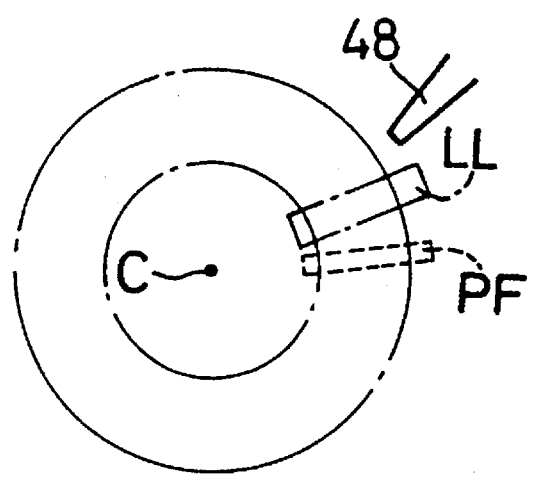
FIG. 6 is a view indicating the positions of a metal powder supply nozzle and an inert gas supply nozzle relative to the laser beam position, in the process of welding to form the cladding in the system of FIG.1.

Step SC6 is followed by step SC7 identical with step SA8 of FIG. 5, and an operation to form the annular cladding N in the annular zone 84 is terminated. In the present embodiment, the workpiece 14 is contoured by the X-Y table 16 along a circle which has a center at the center C of the annular zone 84 and which has an average radius (indicated at D in FIG. 11) of the annulus of the zone 84. During this contouring movement of the workpiece 14, the mirror 38 is rotated by the rotating angle $\theta_A$ calculated depending upon each coordinate position $P_{xy}$ to which the workpiece 14 is moved. As a result, the entire area within the annular zone 84 is irradiated with the laser beam L such that the laser spot is moved along the above-indicated circle while it is reciprocated in the radial direction at each coordinate position $P_{xy}$.

As described above, the present third embodiment of FIGS. 11 and 12 is adapted to move the workpiece by operating the X-Y table 17 during operation of the laser head 18, so that the spot of the laser beam L is moved generally in the circumferential direction of the annular zone 84 to be irradiated. This arrangement requires only the angle of rotation $\theta_A$ of the mirror 38 about the axis A to be controlled depending upon each coordinate position $P_{xy}$ to which the workpiece 14 is incrementally moved. The present embodiment is advantageous over the embodiment of FIG. 5, in that the control of the beam oscillating device 36 is simplified.

Figure 13:
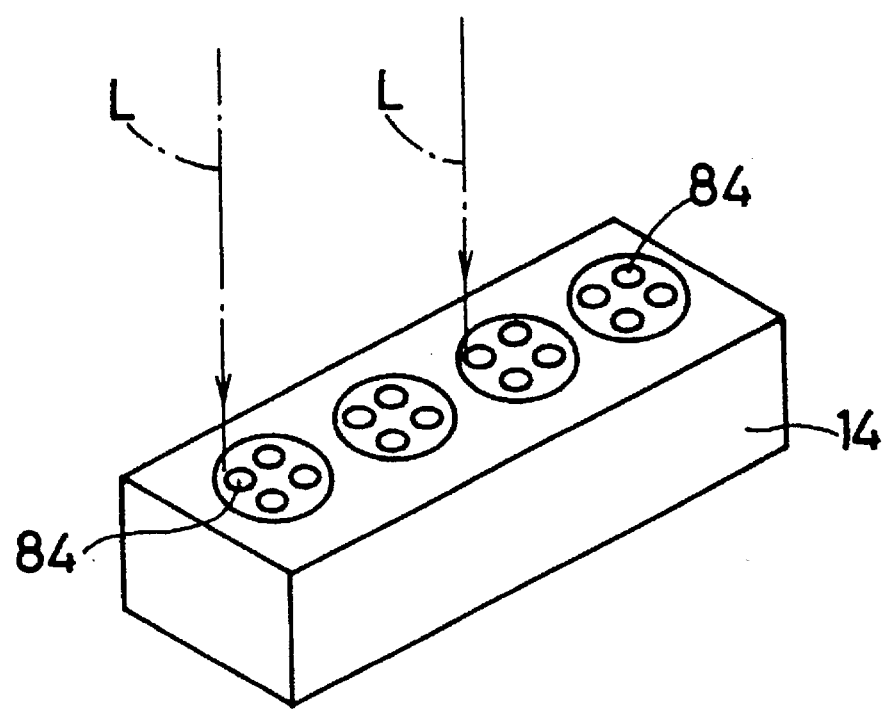
FIG. 13 is a view corresponding to that of FIG. 8, explaining an advantage of the embodiment of FIGS. 11 and 12.

Further, the present embodiment is also capable of performing simultaneous processing operations on a plurality of working portions in the form of the annular zones 84 of the workpiece 14, by the laser beams L generated and deflected by the respective laser heads 18, as shown in FIG. 13, while the workpiece 14 is moved along the X and Y axes as described above. Thus, the production efficiency of the processing system 10 is improved.

Figure 14:
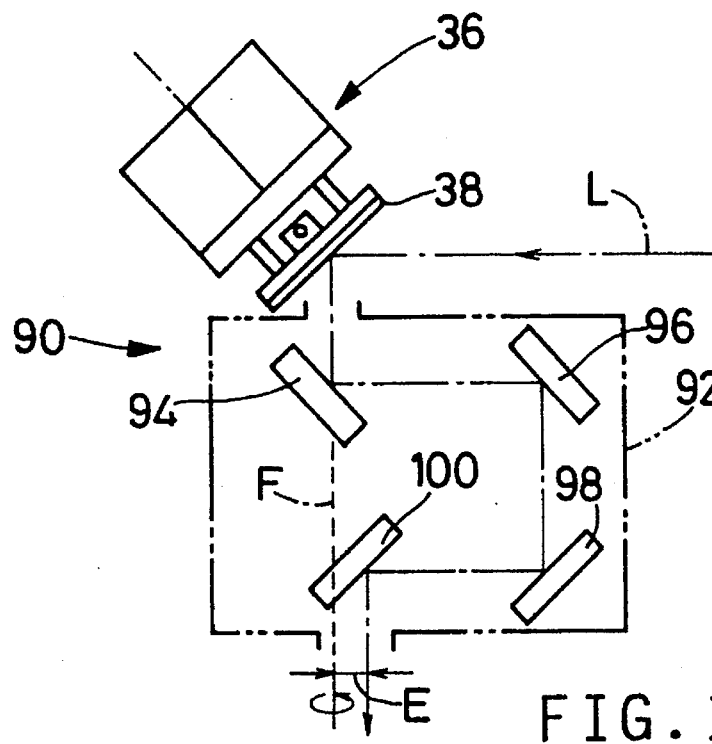
FIG. 14 is a view showing a beam-axis offset device used in a still further embodiment of this invention.

Referring to FIG. 14, there will be described a fourth embodiment of this invention which uses a beam-axis offset device 90 adapted to offset the axis of the laser beam L incident upon the workpiece 14, by a predetermined amount E in the horizontal direction with respect to the axis of the laser beam L as reflected by the mirror 38. The offset device 90 includes a rotary housing 92 which is rotatable about a vertical axis F which is aligned with the axis of the laser beam L as reflected by the mirror 38. Within this rotary housing 92, there are fixedly disposed a first reflecting plate 94, a second reflecting plate 96, a third reflecting plate 98 and a fourth reflecting plate 100. The first reflecting plate 94 reflects the laser beam L reflected from the mirror 38, in the horizontal direction toward the second reflecting plate 96. The second reflecting plate 96 reflects the beam L received from the first reflecting plate 94, in the downward direction toward the third reflecting plate 98, which in turn reflects the received beam L in the horizontal direction toward the fourth reflecting plate 100. The fourth reflecting plate 100 is positioned so that the beam L is reflected downward toward the workpiece 14 along a path which is parallel to the axis F (axis of the beam L as reflected by the mirror 38 of the beam oscillating device 36) and which is offset from the axis F by the predetermined distance E. Thus, the axis of the beam L incident upon the workpiece 14 is offset from the axis of the beam L which is reflected by the mirror 38 and incident upon the offset device 90. In other words, the offset device 90 has an output position which is offset from the axis F.

In the present fourth embodiment, the workpiece 14 is positioned such that the rotation axis F of the rotary housing 92 is aligned with the center C of the annular zone 84, while the offset distance E is determined to be equal to the average radius D of the annular zone 84 (See FIG. 11). The present embodiment is capable of performing the processing operations and has the same advantages as the third embodiment of FIGS. 12 and 13. In operation, the rotary housing 92 is rotated in synchronization with the rotation of the movable reflecting mirror 38 about the axis F by the motor 70, so that the spot of the laser beam L is moved within and along the annulus of the annular zone 84 while the spot is bidirectionally oscillated over the distance equal to the width W by bidirectional pivoting of the mirror 38 about the axis B.

Figure 15:
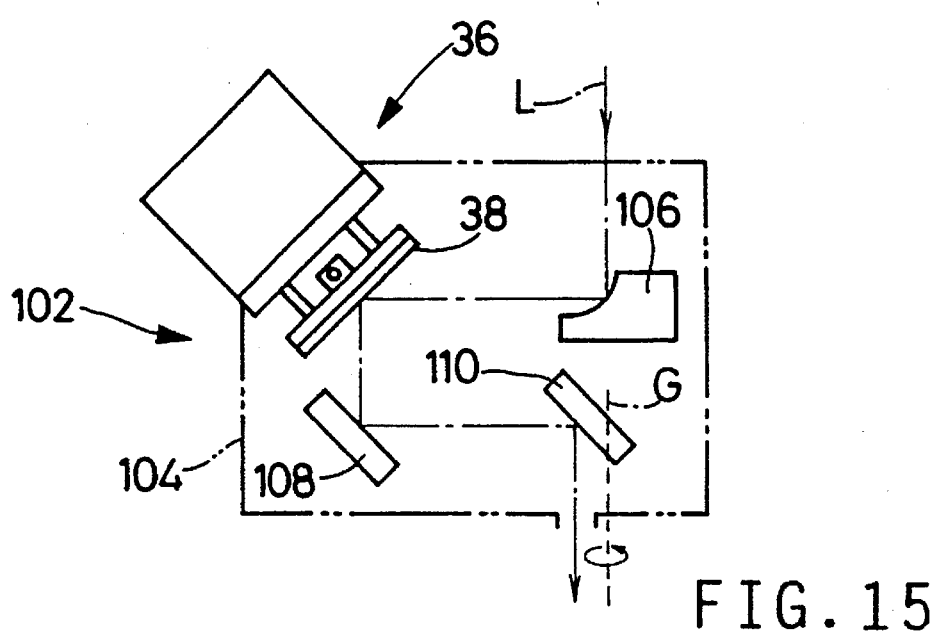
FIG. 15 is a view corresponding to that of FIG. 14, showing a yet further embodiment of this invention.

The beam-axis offset device 90 may be replaced by a beam-axis offset device 102 as shown in FIG. 15, which is used in the laser processing system 10 according to a fifth embodiment of the invention. The offset device 102 includes a rotary housing 104 which is rotatable about a vertical axis G aligned with the laser beam L incident upon the present offset device 102. Within the rotary housing 104, there are fixedly disposed a condensing concave mirror 106 receiving the incident laser beam L, a first reflecting plate 108 and a second reflecting plate 110. The concave mirror 106 reflects the incident beam L in the horizontal direction toward the reflecting mirror 38 of the beam oscillating device 36. In this embodiment, the mirror 38 is accommodated within the housing 104. The first reflecting plate 108 receives the beam L reflected by the mirror 38 in the downward direction, and reflects the beam L in the horizontal direction toward the second reflecting plate 110. The second reflecting plate 110 is positioned so that the axis of the beam L reflected by the plate 110 is parallel to the axis G and is offset from the axis G by a predetermined distance. Thus, the output position of the offset device 102 at which the laser beam is transmitted toward the workpiece 14 is offset from the axis G. The present fifth embodiment has the same advantages as the fourth embodiment of FIG. 14.

In the illustrated embodiments which have been described above, the zone 84 to be irradiated with the laser beam is an annular area having circular inner and outer peripheries and a predetermined constant width. However, the principle of the present invention is equally applicable to a zone or area of any shape on the workpiece, for example, an arcuate, rectangular, linearly elongated or zigzag zone having a desired width which is considerably larger than the diameter of the beam spot.

Figure 16:
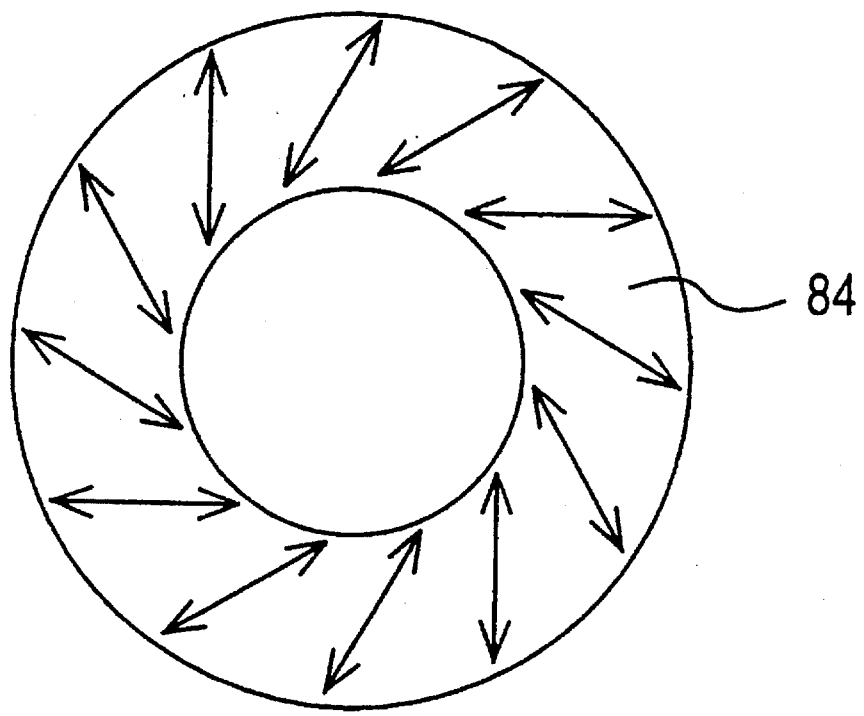
FIGS. 16, 17 and 18 are views illustrating still further embodiments of the invention.
Figure 17:
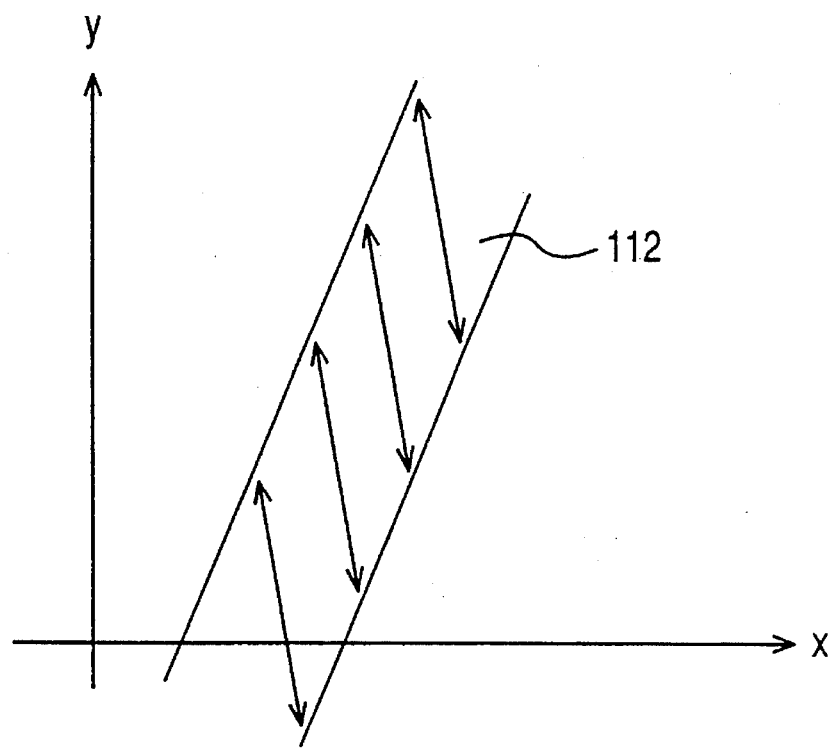
Figure 18:
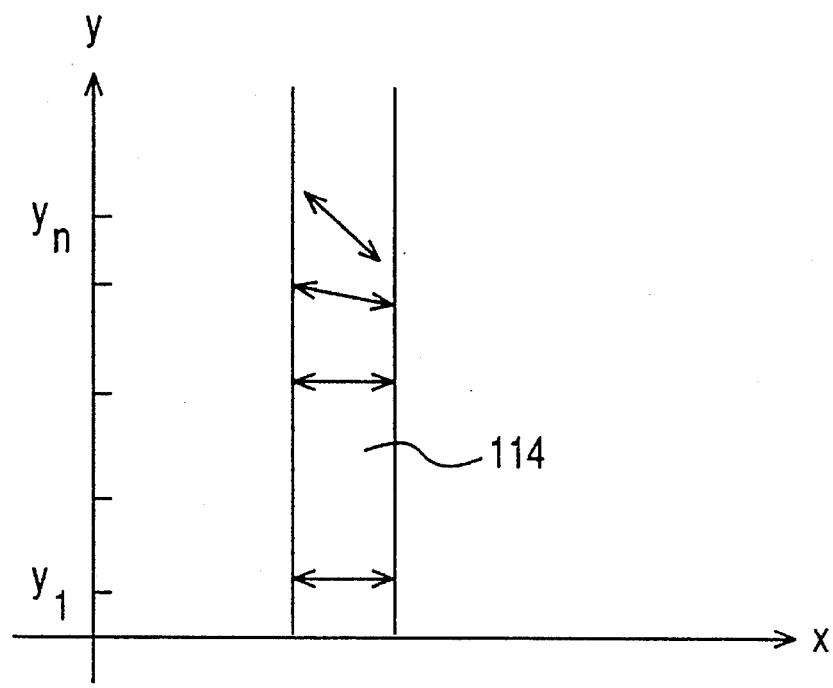
Figure 19:
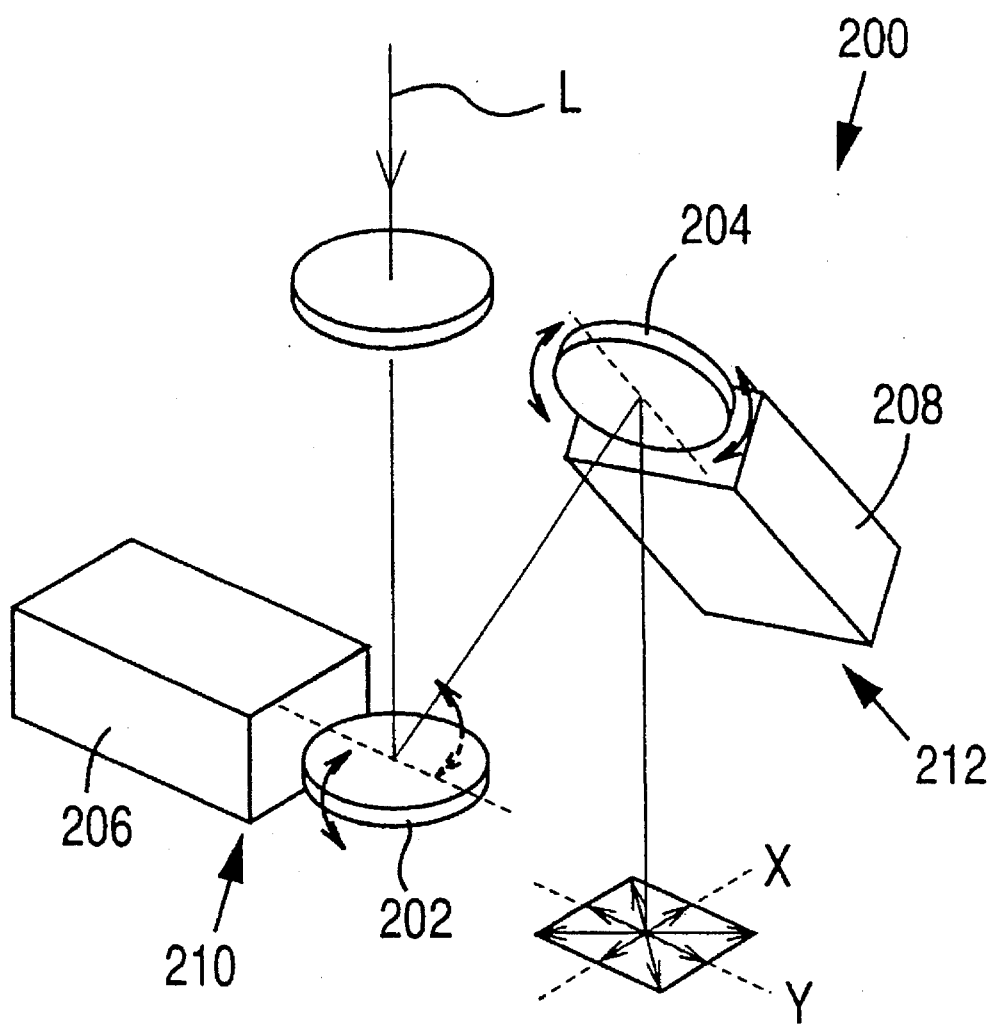
FIG. 19 is a schematic view illustrating a known laser beam oscillating apparatus.

In the illustrated embodiments, the direction of oscillation or reciprocation of the beam spot is perpendicular to the direction of extension of the zone 84, that is, parallel to the radial direction of the annulus of the annular zone 84, and the oscillating distance is equal to the width W of the zone 84. However, the oscillating distance may be larger than the width W, as illustrated in FIG. 16. In the embodiment of FIG. 16, the oscillating direction is inclined by a given angle with respect to the radial direction of the annular zone 84 to be irradiated with the laser beam L. This concept is also applicable to a linearly elongated zone 112 as illustrated in FIG. 17. Namely, the oscillating direction is not perpendicular to the direction of extension (longitudinal direction) of the zone 112, and the oscillating distance is larger than the width W of the zone 112. The embodiments of FIGS. 16 and 17 are advantageous in preventing droop at the edges of a cladding formed by welding using a metal powder by the laser processing system. It is also possible to vary the oscillating direction depending upon the longitudinal position of the zone to be irradiated, where the zone is linearly elongated. An example of this modification is illustrated in FIG. 18, wherein the oscillating direction is varied as a function of the Y-axis coordinate value $Y_n$ of an elongated zone 114 which has a predetermined width in the X-axis direction.

While the present invention has been described in its presently preferred embodiments by reference to the accompanying drawings, it is to be understood that the present invention is not limited to the details of the illustrated embodiments, but may be otherwise embodied.

While the beam oscillating device 36 is constructed such that the axes A and B about which the mirror 38 is rotated and pivoted, respectively, are perpendicular to each other, the axes A and B need not be completely perpendicular to each other. Although the axis B is offset from the surface of the mirror 38 in the direction parallel to the axis A, the mirror holder 64 may be modified so that the axis B is located in a plane which includes the surface of the mirror 38.

Although the system 10 according to the illustrated embodiments is provided with the X-Y table 16 for positioning the workpiece 14, the X-Y table 16 may be replaced by an X-Y table on which the laser head or heads 18 is/are mounted. In this case, the laser head or heads 18 may be positioned relative to the workpiece 14 clamped on the fixture 28. In other words, the system 10 may be modified as desired provided that each laser head 18 and the workpiece 14 may be positioned relative to each other.

While the condensing concave mirror 40 is used in the laser head 18, the concave mirror 40 may be replaced by a condensing convex lens.

It is to be understood that the present invention may be embodied with various other changes, modifications and improvements, which may occur to those skilled in the art without departing from the spirit and scope of the invention defined in the following claims.

What is claimed is:

1. A method of reflecting a laser beam generated by a laser source, by using a movable reflecting mirror, and oscillating a spot of the reflected laser beam incident upon a workpiece for processing the workpiece, said method comprising the steps of:

bidirectionally pivoting said movable reflecting mirror about a first axis at a predetermined frequency, and thereby bidirectionally oscillating the spot of said reflected laser beam incident upon the workpiece; and rotating said movable reflecting mirror about a second axis during bidirectional oscillation of said spot of the reflected laser beam, to thereby change an oscillating direction in which the spot of the reflected laser beam is bidirectionally oscillated, said second axis being perpendicular to said first axis, and to change an angular position of said movable reflecting mirror about said second axis as a function of a position of the spot of the reflected laser beam on the workpiece in a direction other than said oscillating direction, whereby said oscillating direction is changed as the position of said spot on the workpiece is changes in said direction other than said oscillating direction.

2. A method according to claim 1, wherein said workpiece has an annular zone to be processed by said reflected laser beam, said annular zone having a predetermined width as measured in a radial direction thereof, and said step of rotating said movable reflecting mirror about said second axis comprises controlling said angular position of said movable reflecting mirror such that said oscillating direction is parallel to a radial direction of an annulus of said annular zone.

3. A method according to claim 2, wherein said step of bidirectionally pivoting said movable reflecting mirror about said first axis comprises determining an angle of pivoting said movable reflecting mirror about said first axis such that a distance of bidirectional oscillation of said spot of the reflected laser beam is substantially equal to said predetermined width.

4. A method according to claim 1, wherein said workpiece has a generally elongated zone to be processed by said reflected laser beam, said generally elongated zone having a predetermined width as measured in a direction perpendicular to a longitudinal direction thereof, and wherein said step of rotating said movable reflecting mirror about said second axis comprises changing said angular position of said movable reflecting mirror as a function of the position of the spot of the reflected laser beam on the workpiece in said longitudinal direction of said generally elongated zone, whereby said oscillating direction is changed as the position of said spot on the workpiece is changed in said longitudinal direction.

5. A method according to claim 4, wherein said step of bidirectionally pivoting said movable reflecting mirror about said first axis comprises determining an angle of pivoting said movable reflecting mirror about said first axis such that a distance of bidirectional oscillation of said spot of the reflected laser beam is substantially equal to a dimension of said generally elongated zone in said oscillating direction.

6. A laser beam processing system comprising:

an oscillating apparatus for bidirectionally oscillating a spot of a laser beam incident upon a workpiece having an annular zone to be processed with the laser beam, the apparatus including a laser source for generating said laser beam, a movable reflecting mirror pivotable about a first axis, and an oscillating actuator for bidirectionally pivoting said movable reflecting mirror at a predetermined frequency, said laser beam generated by said laser source being reflected by said movable reflecting mirror and thereby incident upon said workpiece, said apparatus comprising, a rotary support member supporting said movable reflecting mirror and said oscillating actuator, said rotary support member being rotatable about a second axis perpendicular to said first axis, and a rotating actuator for rotating said rotary support member about said second axis during bidirectional oscillation of said spot of said laser beam incident upon said workpiece, to thereby change an oscillating direction in which said spot is bidirectionally oscillated;

a positioning device for positioning said workpiece; and rotation control means for controlling said rotating actuator, to change an angular position of said rotary support member and thereby change an angular position of said movable reflecting mirror about said second axis, for thereby changing said oscillating direction such that said oscillating direction is parallel to a radial direction of an annulus of said annular zone.

7. A laser processing system according to claim 6, further comprising initial angle control means for controlling said oscillating actuator to control an initial angle ($\theta_{BI}$) of said movable reflecting mirror about said first axis in relation to said angular position of said movable reflecting mirror about said second axis which is controlled by said rotation control means, said initial angle representing an initial angular position of said movable reflecting mirror about said first axis in which the spot of said laser beam incident upon said workpiece is located on an inner circumference of said annular zone before said movable reflecting mirror is pivoted to bidirectionally oscillate the spot of the laser beam in said radial direction of said annular zone, said initial angle control means cooperating with said rotation control means to move the spot of the laser beam along said annulus of said annular zone.

8. A laser processing system according to claim 7, further comprising oscillating angle control means for controlling said oscillating actuator to control an oscillating angle ($\theta_{BO}$) of said movable reflecting mirror about said first axis in relation to said angular position of said movable reflecting mirror about said second axis, said oscillating angle representing an angle of pivoting of said movable reflecting mirror about said first axis to bidirectionally oscillate the spot of the laser beam from said inner circumference of said annular zone, said oscillating angle control means determining said oscillating angle such that a distance of bidirectional oscillation of said spot is substantially equal to a width of said annular zone as measured in said radial direction.

9. A laser processing system according to claim 7, including a plurality of said laser beam oscillating apparatus, and wherein said workpiece has a plurality of annular zones which are spaced from each other and which are simultaneously processed by the laser beams reflected by the movable reflecting mirrors of said plurality of laser beam oscillating apparatus, respectively.

10. A laser processing system including a laser beam oscillating apparatus as defined in claim 6 and wherein said workpiece has a generally elongated zone to be processed by said laser beam reflected by said movable reflecting mirror, said generally elongated zone having a predetermined width as measured in a direction perpendicular to a longitudinal direction thereof, said system comprising:

rotation control means for controlling said rotating actuator, to change an angular position of said rotary support member and thereby change an angular position of said movable reflecting mirror about said second axis; and oscillating angle control means for controlling said oscillating actuator to control an oscillating angle ($\theta_{BO}$) of said movable reflecting mirror about said first axis in relation to said angular position of said movable reflecting mirror about said second axis, said oscillating angle representing an angle of pivoting of said movable reflecting mirror about said first axis to bidirectionally oscillate the spot of the laser beam within said width of said generally elongated zone, said oscillating angle control means determining said oscillating angle such that a distance of bidiectional oscillation of said spot is substantially equal to a width of said generally elongated zone, said oscillating angle control means cooperating with said rotating control means to move the spot of the laser beam incident upon said workpiece, within said generally elongated zone in said longitudinal direction.

11. A laser processing system including a laser beam oscillating apparatus as defined in claim 6 and wherein said workpiece has an annular zone to be processed by said laser beam reflected by said movable reflecting mirror, said system comprising:

a beam-axis offset device disposed between said laser beam oscillating apparatus and said workpiece and rotatable about a rotation axis aligned with an axis of the laser beam incident upon said offset device, said offset device having an output position at which the incident laser beam is transmitted toward said workpiece and which is offset by a predetermined distance from said rotation axis; and rotation control means for controlling said rotating actuator, to change an angular position of said rotary support member and thereby change an angular position of said movable reflecting mirror about said second axis in relation to an angular position of said offset device about said rotation axis, for thereby changing said oscillating direction such that said oscillating direction is parallel to a radial direction of an annulus of said annular zone.

12. A laser processing system comprising:

a laser beam oscillating apparatus for bidirectionally oscillating a spot of a laser beam incident upon a workpiece to be processed with the laser beam, the apparatus comprising, a laser source for generating said laser beam, a movable reflecting mirror pivotable about a first axis, an oscillating actuator for bidirectionally pivoting said movable reflecting mirror at a predetermined frequency, said laser beam generated by said laser source being reflected by said movable reflecting mirror and thereby incident upon said workpiece, wherein said workpiece has a working portion to be processed by said laser beam reflected by said movable reflecting mirror, said working portion having a predetermined width as measured in a direction perpendicular to a longitudinal direction thereof, a rotary support member supporting said movable reflecting mirror and said oscillating actuator, said rotary support member being rotatable about a second axis perpendicular to said first axis, and a rotating actuator for rotating said rotary support member about said second axis during bidirectional oscillation of said spot of said laser beam incident upon said workpiece, to thereby change an oscillating direction in which said spot is bidirectionally oscillated;

a moving device for moving said workpiece and said laser beam oscillating apparatus relative to each other to move the spot of said laser beam incident upon said workpiece, within said working portion in said longitudinal direction; and rotation control means for controlling said rotating actuator, to change an angular position of said rotary support member and thereby change an angular position of said movable reflecting mirror about said second axis, in relation to a relative position of said workpiece and said laser beam oscillating apparatus, for thereby changing said oscillating direction depending upon said relative position.

13. A laser processing system according to claim 12, wherein said working portion is an annular zone having a predetermined width as measured in a radial direction thereof, and wherein said rotation control means comprises means for determining said angular position of said movable reflecting mirror about said second axis such that said oscillating direction is parallel to said radial direction of said annular zone.

14. A laser processing system according to claim 13, including a plurality of said laser beam oscillating apparatus, and wherein said workpiece has a plurality of annular zones which are spaced from each other and which are simultaneously processed by the laser beams reflected by the movable reflecting mirrors of said plurality of laser beam oscillating apparatus, respectively.

15. A laser beam oscillating apparatus for bidirectonally oscillating a spot of a laser beam incident upon a work piece, the apparatus comprising:

a laser source for generating the laser beam;

a movable reflecting mirror;

means for bidirection ally pivoting said movable reflecting mirror about a first axis at a predetermined frequecy, and thereby bidirectionally oscillaing the spot of said reflected laser beam incident upon the workpiece;

means for rotating said movable reflecting mirror about a second axis during bidirectional oscillation of said spot of the refelected laser beam, to thereby change an oscillating direction in which the spot of the reflected laser beam is bidirectionally oscillated, said second axis being perpendicular to said first sxis; and means for changing an angular position of said movable reflecting mirror about said second axis as a function of a position of the spot of the reflected laser beam on the workpiece in a direction other than said oscillating direction is changes as the position of said spot on the workpiece is a changed in said direction other than said oscillating direction.

\* \* \* \* \*